United States Patent
Thompson

(10) Patent No.: US 11,150,983 B2
(45) Date of Patent: Oct. 19, 2021

(54) SENSING APPARATUS

(71) Applicant: TRW Limited, Solihull West Midlands (GB)

(72) Inventor: Martin Thompson, Solihull (GB)

(73) Assignee: TRW LIMITED, Solihull (GB)

( * ) Notice: Subject to any disclaimer, the term of this patent is extended or adjusted under 35 U.S.C. 154(b) by 0 days.

(21) Appl. No.: 16/530,099

(22) Filed: Aug. 2, 2019

(65) Prior Publication Data

US 2020/0050511 A1 Feb. 13, 2020

(30) Foreign Application Priority Data

Aug. 8, 2018 (GB) ..................................... 1812889

(51) Int. Cl.
*G06F 11/10* (2006.01)
(52) U.S. Cl.
CPC ................................. *G06F 11/1044* (2013.01)
(58) Field of Classification Search
CPC ........................ G06F 11/1048; G06F 11/1044
See application file for complete search history.

(56) References Cited

U.S. PATENT DOCUMENTS

| | | | | |
|---|---|---|---|---|
| 2007/0271493 A1* | 11/2007 | Oh | ...................... | H03M 13/356 714/755 |
| 2008/0012740 A1* | 1/2008 | Li | ...................... | H03M 13/356 341/107 |
| 2009/0075686 A1* | 3/2009 | Gomadam | ........... | H04B 7/0617 455/500 |
| 2010/0070824 A1* | 3/2010 | Ramakrishnan | ...... | H04L 1/1614 714/752 |
| 2011/0080312 A1* | 4/2011 | Oh | ........................ | G08G 1/163 342/70 |
| 2014/0136915 A1* | 5/2014 | Hyde | .................. | G06F 11/0703 714/747 |
| 2016/0352419 A1* | 12/2016 | Fonseka | ............ | H03M 13/2775 |
| 2017/0024127 A1* | 1/2017 | Bazarsky | .............. | G06F 3/0679 |
| 2017/0229025 A1* | 8/2017 | Klinger | .............. | H04B 7/18506 |
| 2017/0294984 A1* | 10/2017 | Ramalho | ............... | H04L 1/0083 |

OTHER PUBLICATIONS

Ruohuang Zheng et al. "Redundant memory array architecture for efficient selective protection;" 2017 ACM/IEEE 44th Annual International Symposium on Computer Architecture (ISCA) (pp. 214-227); Dec. 14, 2017 (Year: 2017).*

* cited by examiner

*Primary Examiner* — Guy J Lamarre
(74) *Attorney, Agent, or Firm* — Tarolli, Sundheim, Covell & Tummino LLP

(57) ABSTRACT

A sensor apparatus includes a sensing means having one or more sensors. A processor unit processes data received from the one or more sensors. The processor unit has a processor, a memory which stores data used by the processor, and a memory controller that receives instructions from the processor and in response writes data output from the processor to the memory or retrieves data from the memory to the processor. The memory controller is configured to read and write data to one or more areas of the memory with ECC protection of the data and arranged to read and write data to one or more areas of the memory without applying any ECC protection. The sensor apparatus may be configured to process data captured from an antenna to identify the position and/or the range of at least one target in the line of sight of the antenna.

16 Claims, 6 Drawing Sheets

| Processor Address | Memory Address | Contents |
|---|---|---|
| 0 | 0 | Program data block 0 |
| 1024 | 1028 | Program data block 1 |
| 2048 | 2056 | Program data block 2 |
| 3072 | 3084 | Scratch data |
| 4096 | 4108 | Sample Data |
| 14336 | 14348 | Critical Configuration data word 0 |
| 14340 | 14356 | Critical Configuration data word 1 |
| 14344 | 14364 | Critical Configuration data word 2 |

Figure 3

| Memory address | Content |
|---|---|
| 0 | Program data block 0 |
| ... | |
| 1024 | ECC for block 0 |
| 1028 | Program data block 1 |
| ... | |
| 2052 | ECC for block 1 |
| 2056 | Program data block 2 |
| ... | |
| 3080 | ECC for block 2 |
| 3084 | Scratch data |
| ... | |
| 4108 | Sample Data |
| ... | |
| 14348 | Critical Configuration data word 0 |
| 14352 | ECC |
| 14356 | Critical Configuration data word 1 |
| 14360 | ECC |
| 14364 | Critical Configuration data word 2 |
| 14368 | ECC |

Figure 4

| Memory address | Content |
|---|---|
| 0 | Program data block 0 |
| ... | |
| 1024 | ECC for block 0 |
| 1028 | Program data block 1 |
| ... | |
| 2052 | ECC for block 1 |
| 2056 | Program data block 2 |
| ... | |
| 3080 | ECC for block 2 |
| 3084 | Critical Configuration data word 0 |
| 14348 | ECC |
| 4108 | Critical Configuration data word 1 |
| ... | ECC |
| 14348 | Scratch data |
| 14356 | Scratch data |
| 14364 | Sample Data |

| Processor Address | Memory Address | Contents |
|---|---|---|
| 0 | 0 | Program data block 0 |
| 1024 | 1028 | Program data block 1 |
| 2048 | 2056 | Program data block 2 |
| 3072 | 3084 | Critical Configuration data word 0 |
| 4096 | 4108 | Critical Configuration data word 1 |
| ... | ... | |
| 14336 | 14348 | Scratch data |
| 14340 | 14356 | Scratch data |
| 14344 | 14364 | Sample Data |

Figure 5

SENSING APPARATUS

RELATED APPLICATION

This application claims priority from British Application No. 1812889.2, filed Aug. 8, 2018, the subject matter of which is incorporated herein by reference in its entirety.

TECHNICAL FIELD

This invention relates to improvements in safety critical sensing apparatus, in particular but not exclusively a radar apparatus for mounting to a vehicle such as a car or truck.

BACKGROUND TO THE INVENTION

One well-known example of a sensing apparatus employs radar in the measurement of distance. In one application, radiation in the microwave region of the spectrum is emitted from a source towards a target. The target will reflect some of this radiation back towards a detector, which is sensitive to radiation in the microwave region of the spectrum. A processor unit may then be used to make a comparison between the emitted signal and the measured, detected, signal from which the range of the target from the source/detector can be estimated.

It is known to provide a frequency shift key scheme to determine the range/distance from the signals. Distance can be measured from the phase difference that is seen in the returned signal when the emitted signal is modulated by a small step change in frequency. The accuracy of the measurement is related to the frequency step size. Similarly, the relative velocity can be measured by looking at the change in phase shift between closely spaced chirps.

There has been a significant amount of development work in the field of radar systems, and many types of radar transmission techniques are available. One technique that has proven suitable for automotive applications is known as Frequency Modulated Continuous Wave (FMCW) radar. In an FMCW radar, the frequency of a signal transmitted by an antenna array is ramped up or down over a range of frequencies defining a chirp. This can be produced relatively simply using a voltage controlled oscillator (VCO). The data collected from each processing cycle will comprise a set of sample data, typically many tens of megabytes of data. In an image processing apparatus these will be pixels in one or more images; for radar they may comprise a set of perhaps 1024 data samples for each antenna in the array.

In the case of a radar apparatus, the key functional elements of a known radar apparatus are an antenna array having multiple elements and a processor unit that processes data captured from the antenna and transmits signals to the antenna. The processor unit includes a processor chip that carries out instructions defined by a computer program stored in a memory and manipulates data such as performing fast Fourier transform (FFT) routines. A memory controller receives instructions from the processor and in response writes data output from the processor to the memory or retrieves data from the memory to the processor. The memory controller is therefore responsible for the control of the data stored in the memory.

The invention may also apply to other sensing apparatus. Suitable examples are LIDAR-based systems, and camera-based systems, where instead of outputting data samples from antenna that are processed the sensors output other data. In the case of a camera-based system, the camera will output image frames where each image is made up of a grid of data.

Because sensing apparatus for vehicles is considered a safety critical system, it is necessary to protect some of the information stored in the memory using a form of error correction code (ECC). The purpose of ECC protection is to allow the controller to detect when data that has been retrieved from the memory has been corrupted and, in some circumstances, correct the corruption.

There are many known error detection and correction schemes that involve storing additional "check data" alongside the data that is critical to the operation of the system. In a simple error detection code scheme, error detection may be done on a single N-bit word level by using even or odd check bits known as parity bits. This allows the system to detect when there is a single bit error in the N-bit word and is well-known in the art. More advanced schemes using error correction codes (ECCs) are also well-known. The N-bit word may be one byte of data, each byte commonly comprising 8 bits of data, or more commonly four bytes of data equaling 32 bits. To accommodate the check bits an additional byte of data must be stored alongside this N-bit word. For memory chips that are only available offering a 32-bit wide data bus, this requires the use of a whole 4-byte wide strip of memory to be used to store the check bits alongside the 4-byte word, which is very wasteful.

It is alternatively known to provide "block based ECC" where the checking is done on a block of N-bit words at once. This block may comprise all of the data that is associated with one memory burst. In this arrangement, multiple check bits are assigned to the whole burst of N-bit words. Again, this form of ECC protection is well-known in the art and has many variations.

The applicant has appreciated that the use of a simple ECC scheme requires additional memory devices to store the check bits of data, which is wasteful in cost, power, and physical space. However, the applicant has further appreciated that "block-based ECC" inflicts a performance overhead, both due to the reading and writing of the check data, and also if a small amount of data in a block must be changed, the whole block must be read in, altered, and then written out again, as it is not possible to just update the changed data and check data in isolation. Both of these are undesirable.

An object of the invention is to provide a sensing apparatus that ameliorates the problems associated with prior art systems.

SUMMARY OF THE INVENTION

According to a first aspect, the invention provides a sensor apparatus comprising:

a sensing means comprising one or more sensors;

a processor unit that processes data received from the one or more sensors, the processor unit comprising a processor, a memory which stores data used by the processor, and a memory controller that receives instructions from the processor and in response writes data output from the processor to the memory or retrieves data from the memory to the processor, in which the memory controller is configured to read and write data to one or more areas of the memory with ECC protection of the data and arranged to read and write data to one or more areas of the memory without applying any ECC protection.

The invention provides a sensor apparatus, in particular a safety critical apparatus, which includes a memory controller which is arranged to treat data that is read or written in different manners according to the type of data. Within the system, data are stored for different reasons. For example, the instructions which the processor executes are very rarely changed, and are critical to the correct operation of the system. These data must be protected against corruption, using ECC. Similarly, some items of configuration or calibration used by the system will also be unchanged during operation and, if corrupted, could cause a violation of the system safety-goals. Again, these should be protected.

Conversely, the data captured from the sensor front-end is only valid for a short period of time, and small individual corruptions can often be shown to be acceptably unlikely to cause a violation of safety goals, and can therefore be stored and retrieved without additional protection. The invention enables this goal to be met.

The sensor means may comprise an antenna array for transmitting radar signals and receiving a portion of the transmitted signal that has been reflected from a target and the processor unit may then in use process data captured from the antenna to identify the position and/or the range of at least one target in the line of sight of the antenna.

The sensor means may comprise in an alternative a light detecting and ranging (LIDAR) array. In another arrangement, it may comprise a camera chip comprising a grid of pixels sensitive to visible or infra-red light, or other ranges of wavelengths of light.

In each case, large volumes of data are captured and processed typically in real time.

The skilled person will understand that the term sensing unit should be construed broadly to cover any active or passive sensor or array of sensors where the system incorporating the sensing unit is in a safety critical application.

The controller may read and write data to a single memory chip that contains all of the one or more areas. It may read and write data to more than one memory chip. In each case, there is no dedicated area of special memory for storing check bits.

The one or more areas which are to provide the ECC protected data may comprise at least one contiguous block of memory that is predefined and hence static. When writing to one of these predefined areas of memory, the ECC protection will be applied and when writing to memory outside of these areas it will not.

Alternatively, the one or more areas which are to use the ECC protection may be defined dynamically as a function of the type of data that is being written to the memory or the type of memory that the processor requests to be read from the memory. In this case a given block of memory may store data of either type (protected or not) at any given time.

The controller may, in use, write to the memory without using ECC protection data, which has a relatively short useful life and hence no safety impact or limited safety impact, and may, in use, write data to the memory using ECC protection when the data has a longer useful life or is otherwise safety critical. The controller may store all data that has a relatively short useful life and/or is not safety critical without using ECC. By short useful life we mean data that will be read back by the processor very soon after it has been written and which will then generally not be used again, and also data that may in fact be overwritten with other data and never read back to the processor.

The longer term data may be considered to be static programme code or variables that are to be infrequently overwritten with updated values.

Additionally or alternatively, the controller may store in the area that uses ECC protection any data which is critical to safety where any corruption could compromise the safety of the system, and may store less safety critical data without using ECC procedure. All safety critical and/or long life data may be stored using ECC by the controller.

The short term data may comprise data samples captured during one or more output reads from a sensor array. In the case of radar apparatus, this may comprise a chirp of the radio frequency signal. The short term data may comprise intermediate or final Fourier transform data generated by the processor when applying a Fourier transform to the data samples or to data derived therefrom The long term data may comprise program code that is executed by the processor and configuration/calibration data.

The processor may be configured to identify the criticality of data that is to be written to the memory to the controller, the controller using this identification to determine whether to store the data as ECC protected data or non-ECC protected data. The controller may be configured to default to protecting everything and then the processor may in use instruct or otherwise configure the controller to indicate that a certain area or item of data needs no protection. When this event occurs the controller may store the data in a region without protection. It may then return to the default.

Where the memory controller stores all data that is ECC protected in one block of memory, for instance in continuous addresses to form a string of data, the controller may protect the entire set of data in that block using a single ECC parity word. The number of parity bits in the word may be a function of the length of the string or the size of the block. The processor may be configured to control the size of the blocks—program code will have big blocks, safety critical variables small blocks so that when they change it can happen quickly and efficiently. The processor may, in use, instruct or otherwise configure the memory controller to use ECC blocks of a defined size which may be as a function of the type of the data that the processor is handling.

Each string that is protected may comprise multiple words in length or may be as short as one word in length. By word we mean the unit length of a data item that is handled by the processor. The number of bits, N, in this word will depend on the processor design but in a radar system may be typically 32 or 64 bits in length.

In an advantageous arrangement, each string may comprise one burst of data associated with a cache-line of the processor, and associated check bits. Alternatively, a much larger section of memory might be protected by a single set of check bits and the whole check calculation is performed periodically in the background—depending on the system definition of how quickly failure should be detected.

The use of these extra check bits only when appropriate reduces the time taken to read and write data to the memory, and all eliminates lost time calculating the check data and checking for errors when it is not required for certain data types.

According to a second aspect, the invention provides a processor unit for a sensor apparatus, in particular an apparatus that is configured to process data captured from an antenna to identify the position and/or the range of at least one target in the line of sight of the antenna, the processor unit comprising:

a processor, a memory which stores data used by the processor, and a memory controller that receives instructions from the processor and in response writes data output from the processor to the memory or retrieves data from the memory to the processor, in which the memory controller is configured to read and write data to one or more areas of the memory with ECC protection of the data and arranged to read and write data to one or more areas of the memory without applying any ECC protection.

Features that are described in the context of separate aspects and embodiments of the invention may be used together and/or be interchangeable. Similarly, where features are, for brevity, described in the context of a single embodiment, these may also be provided separately or in any suitable sub-combination. Features described in connection with the device may have corresponding features definable with respect to the method(s) and the computer program and these embodiments are specifically envisaged.

BRIEF DESCRIPTION OF DRAWINGS

Embodiments of the invention will now be described with reference to the Figures of the accompanying drawings in which:

FIG. 3 shows how data is referenced in the memory by the processor;

FIG. 4 shows how that data is stored in the memory by the memory controller;

FIG. 5 shows how data is referenced in the memory by the processor in a second method of operation;

FIG. 6 shows how that data is stored in the memory by the memory controller in the second method of operation;

As shown in FIG. 1, a sensor apparatus in accordance with the present invention comprises a sensing means comprising one or more sensors and a processor unit that processes data received from the one or more sensors. The invention is not limited to one particular type of sensing means but, for convenience of explanation, FIG. 8 of the drawings shows the various component parts of a radar apparatus in which the sensing means is a radar array.

The embodiment of a radar apparatus that falls within the scope of an aspect of the invention is shown in FIG. 6. This is a conventional arrangement of the kind shown in FIG. 3.1, p90 of http://www.geo.uzh.ch/microsite/rsl-documents/research/SARlab/GMTILiterature/PDF/Skolnik90.pdf. The apparatus comprises an antenna array 10, 20 for transmitting radar signals and receiving a portion of the transmitted signal that has been reflected from a target. The antenna array may have any one of a variety of configurations, both in terms of the number of antenna elements and the pattern in which they are arranged. In this example, there are 32 elements. Each element may function as both a transmit antenna and a receive antenna. The skilled person will appreciate that the invention can be applied to other, non-radar, apparatus, in which case the antenna array may be replaced with a different form of sensor or sensor array. It may comprise an image sensor array such as a camera chip. Where this is the case there may be no transited signals, only signals read out from the chip that replaces the received radar signals.

A processor unit 40 processes data captured from the antenna 10, 20 to identify the position and/or the range of at least one target in the line of sight of the antenna.

The processor unit, in use, transmits high frequency analogue signals to the transmit antenna array in the form of chirps and receives analogue data captured from the receiver antenna array. Between the processor unit and the transmit antenna is a VCO 30, and between the receive antenna and the microprocessor is an RX mixer. The function of the VCO and mixer will be clear to the person skilled in the art.

The processor unit 40 may include appropriate digital to analogue converter circuitry and analogue to digital converter circuitry as shown. The A/D circuitry converts the received data from the mixer into a stream of data values. In some arrangements, the A/D may instead be an integral part of the receiver circuitry, either in discrete form or within an integrated circuit. In other applications, the data output from the antenna array or other sensor array may be digital data.

Figure 1:
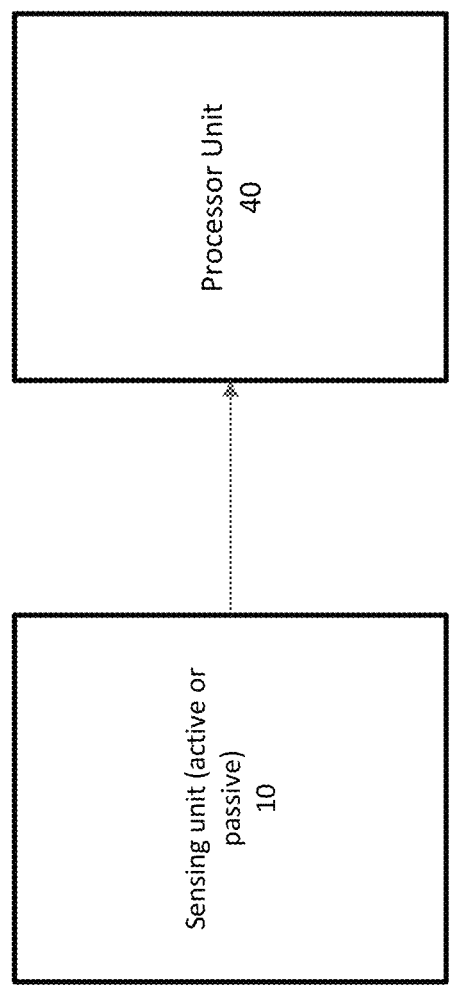
FIG. 1 is a block diagram at the highest level showing the key parts of an apparatus in accordance with the invention.
Figure 2:
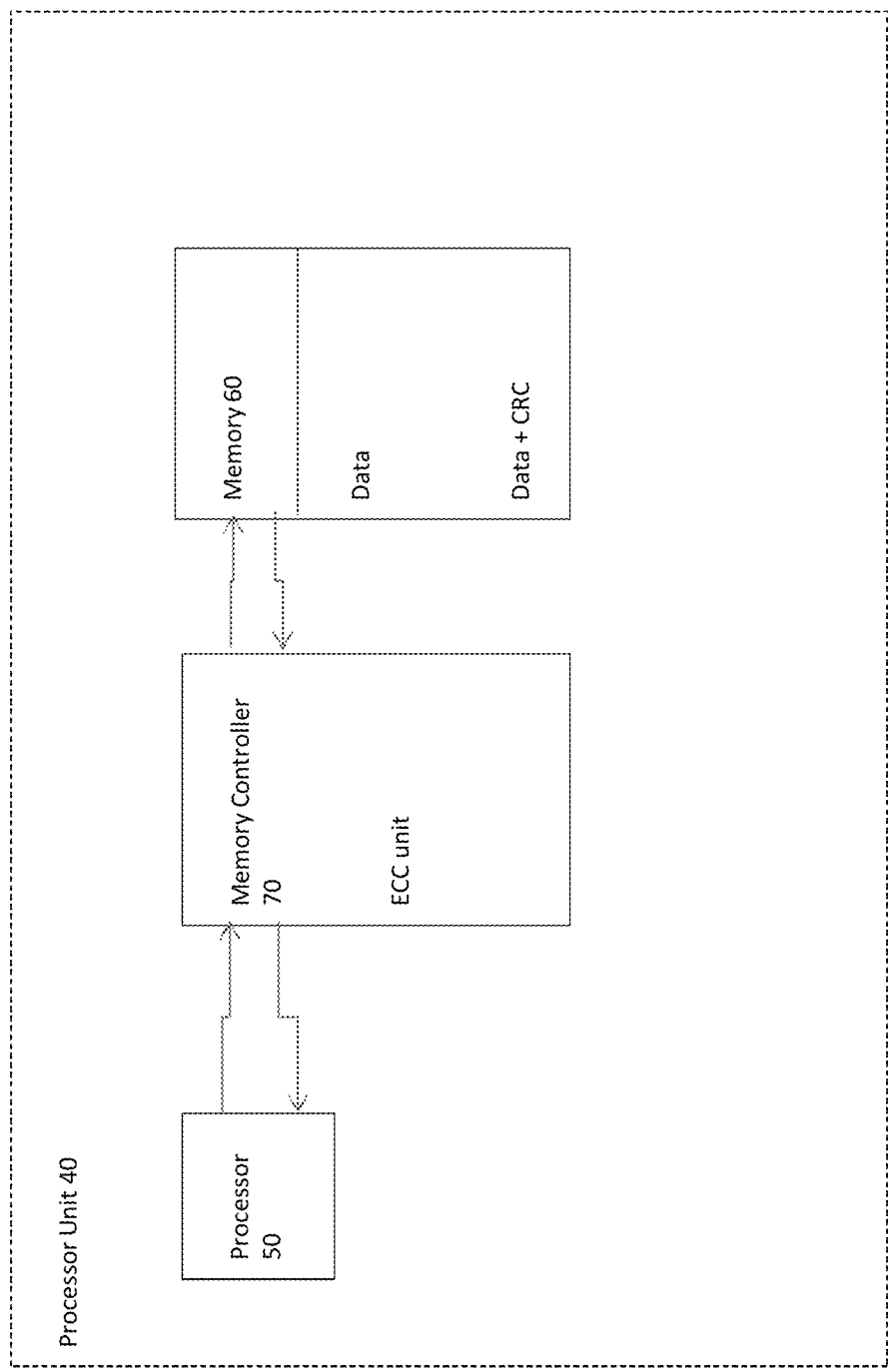
FIG. 2 is a block diagram showing the main parts of the processor unit of the apparatus of FIG. 1.

The processor unit 40 is shown in more detail in FIG. 2 of the drawings. The unit comprises a processor 50 arranged as a single processing chip that executes program instructions, in particular for processing the data received from the antenna each time a chirp is applied. The processing chip in this example has access to a small amount of fast on-chip cache memory for the short term storage of data that is being manipulated by the processor. This is not, however, required in all embodiments that fall within the scope of the invention. A second, larger, area of remote random access memory 60, which functions as the main memory for the processor unit, is provided on a separate memory chip connected to the processor chip by a memory bus and managed by a memory controller 70. In this example, the memory has a width of 4 bytes where each byte comprises 8 bits. Each row of memory therefore holds 32 bits of data.

The function of the memory controller is to manage the transfer of data to and from the main memory during the operation of the radar apparatus, to meet the needs of the processor.

In embodiments of the present invention, the memory controller is configured to read and write data to one or more areas of the memory using an ECC procedure to protect that data, and is also arranged to read and write data to one or more other areas of the memory without using any ECC protection for that data. This operation of the memory controller will generally be effectively transparent to the processor, i.e. the processor does not know if the data that it is handling is stored using ECC protection or not, nor is it known if data that it is requesting for retrieval is protected by ECC or not. That decision is made by the memory controller in this embodiment.

The operation of the memory controller to read and write different types of data during the use of the radar system will now be explained with reference to two slightly different methods of operation.

First Method of Operation

In a first method of operation, shown in FIGS. 5 and 6, the memory is pre-divided into two large continuous blocks of memory addresses 80, 90. A first one of the blocks 80 may store non-ECC protected data and a second one of the blocks 90 may store ECC protected data. The memory in each block is identical, and it is the way in which the controller reads and writes the data that achieves the appropriate protection of the data stored in each block.

Writing Data to the Memory

In writing this data to the memory the controller will initially receive a write request from the processor. From this, the controller determines whether the data is within the block that is to be protected by the ECC scheme or not. This is achieved in this example from the processor address, which will indicate a protected or unprotected block. It may, in an alternative, do this by receiving from the processor information identifying the type of data.

In the case where data is written to the memory that is to be protected, the check bits of data are calculated by the controller by first retrieving all of the data in the protected block, updating the written to locations, and calculating a new set of check data for the whole block. The entire block of data and the new check data are then written back to the block of memory.

This is shown in FIGS. 5 and 6. In FIG. 5 the memory positions stored by the processor are indicated and in FIG. 6 the corresponding actual memory positions in the memory as held by the memory controller are shown. As can be seen, program data and critical data are stored with ECC protection, and scratch data—such as the bursts of data associated with a chirp—are stored with no ECC protection. All the protected data is stored as one block in a reserved block of memory.

If the data is not to be protected, it is written to the memory with no additional check data. This is shown in FIGS. 5 and 6 as scratch data.

Reading Data from the Memory.

When the processor requests the data, the controller looks up the appropriate memory address from a table that maps the processor memory and the real memory addresses. This provides the mapping between FIG. 5 and FIG. 6. Having looked up the correct address, the memory controller retrieves the data. If the address corresponds to a non-ECC protected area, the controller receives the data and does not perform any checks and hence does not retrieve any check bits. If it corresponds to an item of data in the ECC protected area, the controller receives the data and the block level check data and then performs the appropriate checks (and corrections) depending on the type of ECC used.

Figure 7B:
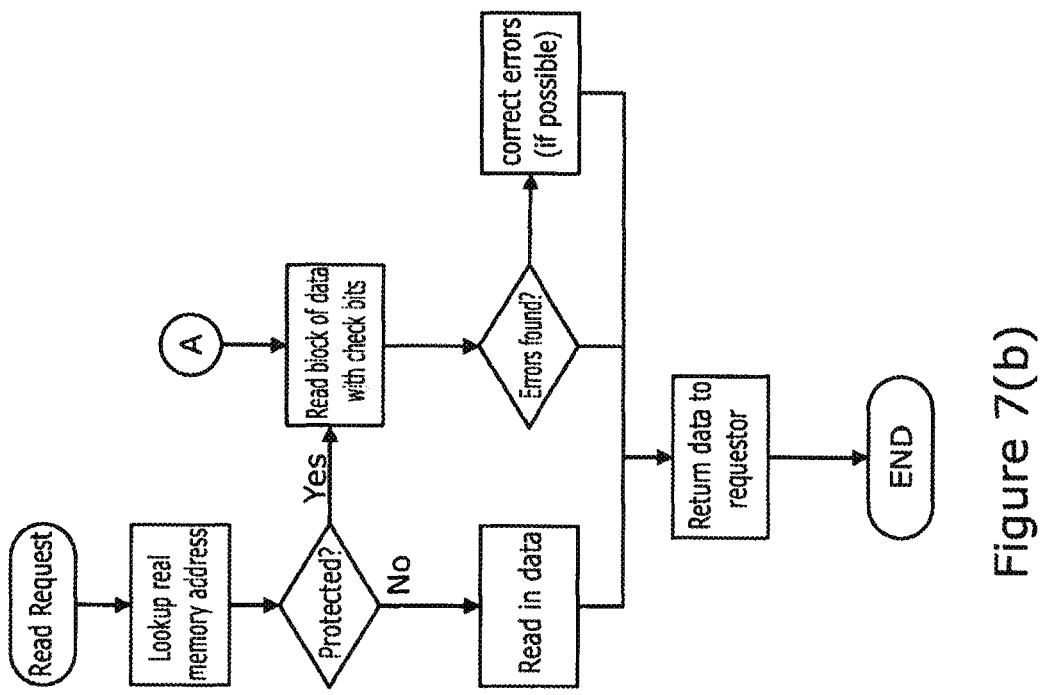
FIG. 7(a) is a flow diagram showing the steps of writing the protected data to the memory and FIG. 7(b) is a corresponding flow diagram showing the steps of reading the protected data.
Figure 7A:
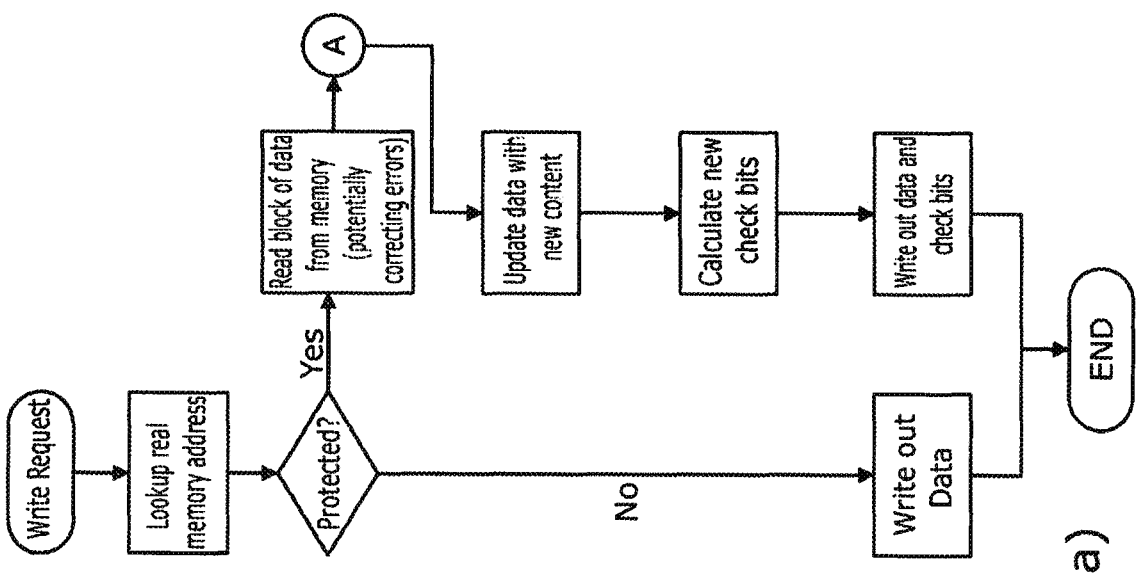
Figure 8:
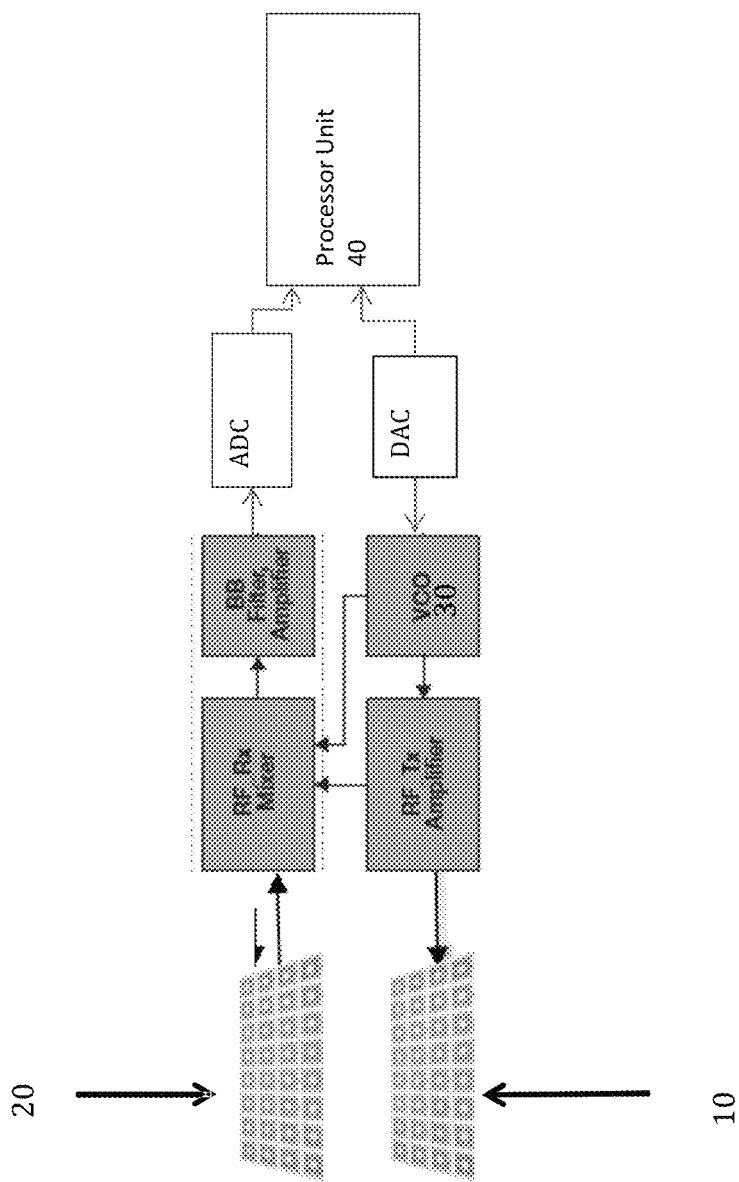
FIG. 8 shows the arrangement of components in an exemplary implementation of the invention as a radar apparatus for a vehicle.

FIG. 7(a) is a flow diagram of the process writing out data to memory with ECC protection applied. FIG. 7(b) is a similar flowchart for the steps of reading out data from the memory. Note in each case the use of the look up table that maps the processor held locations of addresses with the actual memory addresses.

Second Method of Operation

In an alternative, second method of operation shown in FIGS. 3 and 4, the memory is not divided up into two blocks. Instead, data that is protected is stored interspersed with data that is not protected, with each block of data that is protected being allocated its own check bits of data.

The addresses, sizes and other information (such as ECC methods, etc.) are configured into the memory controller by the processor.

If data is to be protected, the controller identifies this by the processor address provided, and applies ECC protection routines to determine appropriate check bits for the data. The data, in fact, will take up at least one more location than the block size. Also note that they do not need to be adjacent although it is simplest to implement if they are.

If the data is identified as not to be protected, it is stored directly into memory as with the first method of operation.

A benefit of this second embodiment compared with the first is that it there is less movement of the whole block of protected data into and out of the memory each time data is requested by the processor, because the ECC procedure works within smaller block sizes which can be configured to match the data being stored. The tradeoff is that more memory is needed to store all the check data.

FIGS. 5 and 6 show how data is stored in this way in the memory, for the same data shown for the first method.

Modifications to the First and Second Methods

Of course, in the first method the whole second block of protected data could be divided up into many sub-blocks, each longer than one word and each protected on the sub-block level using an appropriate ECC procedure. This will reduce the amount of data that is read and written each time, allowing a compromise between speed and the amount of data needed to be reached. This may be appropriate where the burst length is much smaller than the number of rows in the protected area of memory, for instance where the antenna array has a small number of antennas or a small number of data bins are generated for each chirp.

The first and second methods may therefore be considered to be extreme examples of how the data may be stored in the memory, with many variations in between using more sub-blocks of protected data. The first method can be considered to be an implementation using the minimum number of blocks and the second the maximum number. In practice, in the first method the location of blocks which are protected or unprotected is set permanently rather than being more fluid.

From reading the present disclosure, other variations and modifications will be apparent to the skilled person. Such variations and modifications may involve equivalent and other features which are already known in the art, and which may be used instead of, or in addition to, features already described herein.

Although the appended claims are directed to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable sub-combination. The applicant hereby gives notice that new claims may be formulated to such features and/or combinations of such features during the prosecution of the present application or of any further application derived therefrom.

For the sake of completeness it is also stated that the term "comprising" does not exclude other elements or steps, the term "a" or "an" does not exclude a plurality, a single processor or other unit may fulfill the functions of several means recited in the claims and any reference signs in the claims shall not be construed as limiting the scope of the claims.

The invention claimed is:

1. A sensor apparatus comprising:
a sensing means comprising one or more sensors;
a processor unit that processes data received from the one or more sensors, the processor unit comprising a processor, a memory which stores data used by the processor, and a memory controller that receives instructions from the processor and in response writes data output from the processor to the memory or retrieves data from the memory to the processor, in which the memory controller is configured to read and write data to areas of the memory with ECC protection of the data and arranged to read and write data to the areas of the memory without applying the ECC protection, the memory controller being configured to identify an area of the areas in the memory to which the memory controller is to read the data from or write the data to based on a mapping table, the mapping table comprising processor addresses for the processor that map to respective memory addresses of the memory, wherein a first subset of memory addresses of the respective memory addresses are associated with respective areas of a first set of areas of the areas in the memory, and a second subset of memory addresses of the respective memory addresses are associated with respective areas of a second set of areas in the memory.

2. A sensor apparatus according to claim 1, in which the memory controller reads and writes the data to a single memory chip that contains all of the one or more areas.

3. A sensor apparatus according to claim 1, wherein the first set of areas in the memory which store ECC protected data comprise at least one contiguous block of memory that is predefined and hence static.

4. A sensor apparatus according to claim 1, wherein the first set of areas in the memory which are to store ECC protected data are defined dynamically as a function of a type of data that is being written to the memory or a type of memory that the processor requests to be read from the memory.

5. A sensor apparatus according to claim 1, in which the memory controller is configured, in use, to write to the memory the data to the first set of areas of the areas in the memory without using ECC protection when the data has a relatively short useful life, and configured to write the data to the second set of areas of the areas in the memory using ECC protection when the data has a longer useful life or is otherwise safety critical.

6. A sensor apparatus according to claim 1, wherein the memory controller is configured to store the data in the second set of areas of the areas in the memory when the data is critical to safety using ECC protection where any corruption could compromise the safety of a vehicle system, and store the data in the first set of areas of the areas in the memory when the data is less critical to safety without using ECC protection.

7. A sensor apparatus according to claim 1, wherein the controller is configured to write short term data to the first set of areas of the areas in the memory without using ECC protection and write long term data to the second set of areas of the areas in the memory using ECC protection, the short term data comprising data samples captured during one or more output reads from a sensor array, the long term data comprising program code that is executed by the processor and configuration/calibration data.

8. A sensor apparatus according to claim 1, wherein the processor is configured to identify a type of data that is to be written to the memory to the controller, the memory controller determining whether to store the data as ECC protected data or non-ECC protected data therefrom.

9. A sensor apparatus according to claim 1, wherein each string of the data that is to be ECC protected comprises one or more words in length.

10. A sensor apparatus according to claim 1, wherein each string of the data that is to be ECC protected comprises one burst of data associated with a cache-line of the processor, and associated check bits as required.

11. A sensor apparatus according to claim 1, wherein the sensing means comprise an antenna array for transmitting radar signals and receiving a portion of the transmitted radar signals that has been reflected by a target, the processor unit processing data captured from the antenna array to identify the position and/or the range of at least one target in the line of sight of the antenna based on the received portion of the transmitted radar signals that have been reflected by the target.

12. A sensor apparatus according to claim 1, in which the memory controller is configured to write the data captured by the one or more sensors to the memory without using ECC protection, and configured to write program code that is executed by the processor and configuration/calibration data to the memory using ECC protection.

13. The sensor apparatus according to claim 1, wherein the first set of areas in the memory correspond to a non-ECC protected area in the memory and the second set of areas of the area in the memory correspond to an ECC protected area in the memory.

14. The sensor apparatus according to claim 13, wherein the memory controller is configured to determine whether to write the data with or without ECC protection to the memory based on the processor addresses, wherein each processor address indicates whether a respective area of the areas in the memory is a non-ECC protected area or an ECC protected area.

15. A processor unit for a sensor apparatus, the sensor apparatus being configured to process data captured from an antenna to identify the position and/or the range of at least one target in the line of sight of the antenna, the processor unit comprising:

a processor, a memory which stores data used by the processor, and a memory controller that receives instructions from the processor and in response writes data output from the processor to the memory or retrieves data from the memory to the processor, in which the memory controller is configured to read and write data to areas of the memory with ECC protection of the data and arranged to read and write data to the areas of the memory without applying the ECC protection, the memory controller being configured to identify an area of the areas in the memory to which the memory controller is to read the data from or write the data to based on a mapping table, the mapping table comprising processor addresses for the processor that map to respective memory addresses of the memory, wherein a first subset of memory addresses of the respective memory addresses are associated with respective areas of a first set of areas of the areas in the memory, and a second subset of memory addresses of the respective memory addresses are associated with respective areas of a second set of areas in the memory.

16. A processor unit according to claim 15, wherein the memory controller is configured to write the data captured by the antenna to the memory without using ECC protection, and configured to write program code that is executed by the processor and configuration/calibration data to the memory using ECC protection.

* * * * *